United States Patent [19]

Ogasawara et al.

[11] Patent Number: 4,740,399
[45] Date of Patent: Apr. 26, 1988

[54] METAL-CERAMIC COMPOSITE BODIES

[75] Inventors: Takayuki Ogasawara, Nagoya;
Takeyuki Mizuno, Toyohashi, both of Japan

[73] Assignee: NGK Insulators, Ltd., Aichi, Japan

[21] Appl. No.: 39,427

[22] Filed: Apr. 17, 1987

[30] Foreign Application Priority Data

Apr. 21, 1986 [JP] Japan ................................. 61-90007

[51] Int. Cl.$^4$ ............................................. B32B 9/04
[52] U.S. Cl. ....................................... 428/35; 428/472; 428/698
[58] Field of Search ................... 428/35, 36, 698, 699, 428/472, 469, 701

[56] References Cited

U.S. PATENT DOCUMENTS

| 2,282,106 | 5/1942  | Underwood      | 428/472 X |
| 2,700,561 | 2/1957  | Forge          | 428/472 X |
| 2,948,992 | 8/1960  | Oldfield et al.| 428/472 X |
| 3,340,026 | 9/1967  | Kiwak          | 428/472 X |
| 3,404,968 | 10/1968 | Rohrer         | 428/472 X |
| 4,055,451 | 10/1977 | Cockbain et al.| 428/472 X |
| 4,109,031 | 8/1978  | Marscher       | 428/472 X |
| 4,371,588 | 2/1983  | Kyle           | 428/472 X |
| 4,532,179 | 7/1985  | Takami et al.  | 428/472 X |
| 4,637,960 | 1/1987  | Hatakeyama et al. | 428/472 X |

Primary Examiner—Nancy A. B. Swisher
Attorney, Agent, or Firm—Parkhurst & Oliff

[57] ABSTRACT

A metal-ceramic composite body comprises a metallic member and a ceramic member fitted thereinto. The metallic member has an effective strain A represented by the equation: $A = (T_a - T_r) \times \Delta_a + \Delta_d$.

1 Claim, 2 Drawing Sheets

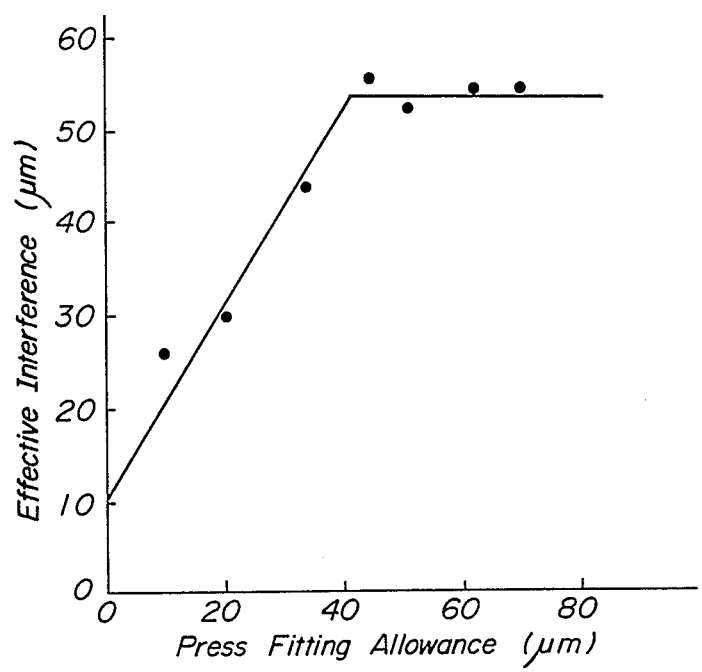
FIG_2
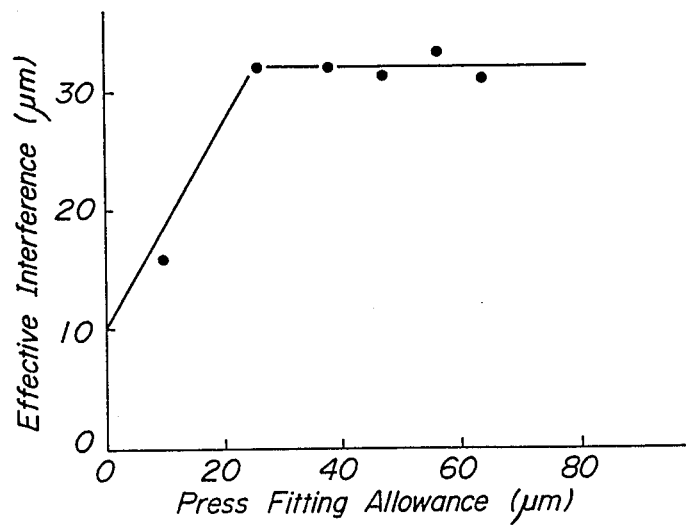
FIG_3

METAL-CERAMIC COMPOSITE BODIES

BACKGROUND OF THE INVENTION

1. Field of the Invention

This invention relates to metal-ceramic composite bodies, and more particularly to a metal-ceramic composite body produced by positioning a fitting between metal and ceramic.

2. Related Art Statement

In general, ceramic members are durable at elevated temperatures and have high strength and hardness and excellent corrosion resistance, so that attempts have been made to use them for various applications requiring high strength and wear resistance under high temperature environment, such as engine parts for automobiles, gas turbine parts and parts for industrial machines, and among them some parts have been practised. In these parts, however, the use of the ceramic member alone is a rare case, and a combination of the ceramic member with a metallic member is usually used for the following reason. That is, although the ceramic members have the aforementioned excellent properties, they are difficult to work and they are brittle, so that the ceramic member is applied to only a required portion of the part and the remaining portion of the part is constructed with the metallic member easy to work.

Currently, there are many methods of joining the ceramic member to the metallic member, among them fitting ceramic and metal such as press fitting, shrink fitting, cold fitting or the like.

In general, when the fitting between the ceramic member and the metallic member is, for example, a shrink fitting, if the ceramic member is a column and the metallic member is a cylinder or is provided at the end portion with a receiving hole, the interference S is represented by the following equation:

$$S = D_C - D_M,$$

wherein $D_C$ is a diameter of the columnar ceramic member and $D_M$ is an inner diameter of the cylindrical metallic member. In this case, since $D_C > D_M$, when a clearance in the shrink fitting operation is C, the given interference is obtained by heating the metallic member up to a temperature satisfying $D_M \geq D_C + C$, inserting the ceramic member into the expanded metallic member and then cooling the metallic member to room temperature.

However, since the face pressure (or fitting force) is proportional to the interference S, it is required to severely control the sizes of the ceramic member and the metallic member for controlling the face pressure. That is, it is required to work the diameters of these members with a considerably high accuracy for controlling the face pressure. However, the working of the ceramic member is particularly difficult, requiring great labor.

SUMMARY OF THE INVENTION

It is an object of the invention to solve the aforementioned problems and to provide metal-ceramic composite bodies capable of strongly connecting metal to ceramic without requiring a highly accurate fitting allowance (shrink fitting allowance).

According to the invention, there is the provision of a metal-ceramic composite body comprising a metallic member made of an age-hardening type alloy and provided with a concave portion or a through-hole and a ceramic member having a columnar or cylindrical shape or provided with a convex portion and fitted into the concave portion or through-hole; said metallic member having an effective strain A in fitting represented by the following equation:

$$A = (T_a - T_r) \times \Delta_a + \Delta_d,$$

wherein A is the effective strain (interference at room temperature after age-hardening/diameter in fitting portion of ceramic member), $T_a$ is the aging temperature, $T_r$ is room temperature, $\Delta_a$ is the difference in thermal expansion coefficient between the ceramic and the metal and $\Delta_d$ is the shrinkage of metallic member through aging.

BRIEF DESCRIPTION OF THE DRAWINGS

FIGS. 2 and 3 are graphs showing a relation between press fitting allowance and effective interference in some embodiments of the metal-ceramic composite body according to the invention.

DESCRIPTION OF THE PREFERRED EMBODIMENTS

Figure 1:
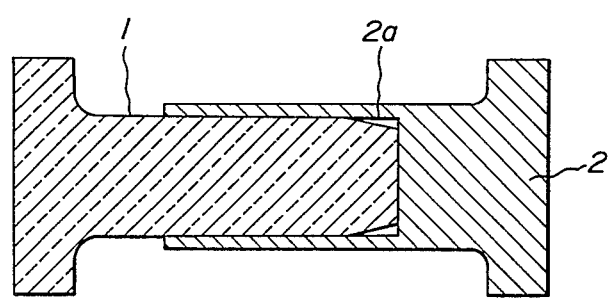
FIG. 1 is a sectional view of an embodiment of the metal-ceramic composite body according to the invention.

According to the invention, the age-hardening type alloy is used as a metallic member and the ceramic member is press fitted into the metallic member at an unaged state and then the resulting assembly is age-hardened at a given temperature for a given time. It has been found that when the effective strain A after the fitting satisfies $A = (T_a - T_r) \times \Delta_a + \Delta_d$, it is not necessary to perform the working before the fitting with a high accuracy. That is, if it can be confirmed that the effective strain A of the metallic member after the drawing from the composite body worked and fitted under a certain condition satisfies the above equation, when the working is applied to metallic members under the same condition or under a condition that the press fitting allowance before fitting is larger than the value worked under the above condition, the best effective strain A is always obtained and hence the joining strength can be kept at a constant value.

This is based on the fact that even if a certain fitting allowance is present at the press fitting, when the value is larger than the constant value, the metallic member is substantially creeped out at the aging temperature and consequently the effective interference or effective strain is determined by the difference between the age-hardening temperature and room temperature, the difference in thermal expansion coefficient between ceramic and metal and the shrinkage of the metallic member through aging.

The invention will be described with reference to an embodiment below.

At first, there are provided a metallic member made of an age-hardening alloy such as maraging steel or the like and provided with a concave portion or a through-hole, and a ceramic member having a columnar or cylindrical shape or provided with a convex portion. The inner diameter of the metallic member and the outer diameter of the ceramic member to be joined are worked into given sizes. In this case, the working is carried out according to such a working condition that a value of effective strain A of the metallic member measured after drawing from a composite body obtained by previously joining the ceramic member and the metallic member of the same shape and age-hardening the assembly at a given temperature for a given time (a value obtained by dividing effective interference by outer diameter of ceramic member) satisfies the following equation:

$$A = (T_a - T_r) \times \Delta_a + \Delta_d,$$

wherein $T_a$ is an aging temperature, $T_r$ is room temperature, $\Delta_a$ is a difference in thermal expansion coefficient between ceramic and metal and $\Delta_d$ is a shrinkage of metallic member through aging. For instance, when the age-hardening temperature is 540° C., the above condition can be achieved at such a state that the press fitting strain is not less than $4.3 \times 10^{-3}$. The value for the press fitting strain is obtained by dividing the press fitting allowance (the difference in diameter between the ceramic and the metal before the fitting) by the diameter of ceramic member before the fitting.

After the working, the ceramic member is fitted into the metallic member and age-hardened at the given temperature for the given time to form a metal-ceramic composite body. Typically, if the metallic member is hardened before the fitting of the ceramic member, the metallic member or the ceramic member is unfavorably broken in the fitting of both members.

The following examples are given in illustration of the invention and are not intended as limitations thereof.

EXAMPLE 1

A metal-ceramic composite body as shown in FIG. 1 was produced by press fitting a ceramic column 1 made from a sintered silicon nitride 10 mm in diameter into a concave portion 2a about 10 mm in inner diameter and 12 mm in outer diameter formed in an age-hardening metallic member 2 made from a maraging steel and then age-hardening at 550° C. for 2 hours. The fitted length was 15 mm. In this case, the press fitting allowance was varied as shown in the following Table 1 to obtain the composite bodies of Samples 1-7. Further, the inner diameter of the metallic member after the drawing of the ceramic member from each of the composite bodies was measured. The difference between the inner diameter of the metallic member after the drawing and the outer diameter of ceramic member, i.e. the shrinked amount of the inner diameter of metallic member was substantially an effective shrink fitting allowance in the composite body, referred to as effective interference hereinafter. The measured results are shown in Table 1, and a relation between press fitting allowance and effective interference is shown in FIG. 2.

TABLE 1

| Sample No. | (A) Outer diameter of ceramic member (mm) | (B) Inner diameter of metallic member before press fitting (mm) | (A)−(B) Press fitting allowance (μm) | (A)−(B)/A Press fitting strain | (C) Inner diameter of metallic member after drawing (mm) | (A)−(C) Effective interference (μm) | (A)−(C)/A Effective strain |
|---|---|---|---|---|---|---|---|
| 1 | 10.011 | 9.995 | 16 | $1.60 \times 10^{-3}$ | 9.985 | 26 | $2.6 \times 10^{-3}$ |
| 2 | 10.022 | 10.002 | 20 | $2.00 \times 10^{-3}$ | 9.992 | 30 | $3.0 \times 10^{-3}$ |
| 3 | 10.016 | 9.982 | 34 | $3.39 \times 10^{-3}$ | 9.972 | 44 | $4.4 \times 10^{-3}$ |
| 4 | 10.035 | 9.990 | 45 | $4.48 \times 10^{-3}$ | 9.980 | 55 | $5.5 \times 10^{-3}$ |
| 5 | 10.014 | 9.963 | 51 | $5.09 \times 10^{-3}$ | 9.961 | 53 | $5.3 \times 10^{-3}$ |
| 6 | 10.043 | 9.981 | 62 | $6.17 \times 10^{-3}$ | 9.989 | 54 | $5.4 \times 10^{-3}$ |
| 7 | 10.028 | 9.958 | 70 | $6.98 \times 10^{-3}$ | 9.974 | 54 | $5.4 \times 10^{-3}$ |

As seen from Table 1 and FIG. 1, the effective interference is substantially constant at a value larger than a certain press fitting allowance. In this example, the effective interference of more than about 54 μm cannot be obtained even when the press fitting allowance becomes larger than the certain value.

EXAMPLE 2

A silicon nitride column of about 6 mm in outer diameter was press fitted into a concave portion of 10 mm in length and about 6 mm in inner diameter provided in an end face of a rod-like metallic member of 8 mm in outer diameter made of a maraging steel, which was age-hardened at 530° C. for 6 hours in the same manner as described in Example 1. In this case, the press fitting allowance was varied and then the drawing test was performed after the aging to examine a relation between effective interference and press fitting allowance. The measured results are shown in the following Table 2, while the relation between press fitting allowance and effective interference is shown in FIG. 3.

TABLE 2

| Sample No. | (A) Outer diameter of ceramic member (mm) | (B) Inner diameter of metallic member before press fitting (mm) | (A)−(B) Press fitting allowance (μm) | (A)−(B)/A Press fitting strain | (C) Inner diameter of metallic member after drawing (mm) | (A)−(C) Effective interference (μm) | (A)−(C)/A Effective strain |
|---|---|---|---|---|---|---|---|
| 1 | 6.140 | 6.130 | 10 | $1.63 \times 10^{-3}$ | 6.124 | 16 | $2.6 \times 10^{-3}$ |
| 2 | 6.153 | 6.127 | 26 | $4.23 \times 10^{-3}$ | 6.121 | 32 | $5.2 \times 10^{-3}$ |
| 3 | 6.144 | 6.106 | 38 | $6.18 \times 10^{-3}$ | 6.112 | 32 | $5.2 \times 10^{-3}$ |
| 4 | 6.135 | 6.088 | 47 | $7.66 \times 10^{-3}$ | 6.104 | 31 | $5.1 \times 10^{-3}$ |
| 5 | 6.157 | 6.101 | 56 | $9.10 \times 10^{-3}$ | 6.124 | 33 | $5.4 \times 10^{-3}$ |
| 6 | 6.163 | 6.100 | 63 | $10.2 \times 10^{-3}$ | 6.132 | 31 | $5.0 \times 10^{-3}$ |

As seen from Table 2 and FIG. 3, the effective interference is substantially constant at a value larger than the certain press fitting allowance as in the case of Example 1. That is, effective interference of more than about 32 μm cannot be obtained when the press fitting allowance is larger than the certain value.

From the above Examples 1 and 2, it has been found that the effective strain A generalizing the constant maximum effective interference is represented by the following equation considering the difference in thermal expansion coefficient between ceramic and metal, aging temperature, shrinkage and the like:

$$A = (T_a - T_r) \times \Delta_a + \Delta_d,$$

wherein A is an effective strain (effective interference/outer diameter of ceramic member), $T_a$ is an aging temperature, $T_r$ is room temperature, $\Delta_a$ is a difference in thermal expansion coefficient between ceramic and metal and $\Delta_d$ is a shrinkage of metallic member through aging. That is, in Example 1, $T_a = 550°$ C., $T_r = 20°$ C., the thermal expansion coefficients of the metallic member and the ceramic member were $11.3 \times 10^{-6}/°$C. and $3.08 \times 10^{-6}/°$C. and hence $\Delta_a = 8.22 \times 10^{-6}/°$C. and $\Delta_d = 0.1\%$. When these values are substituted into the above equation, $A = 5.36 \times 10^{-3}$, which well meets with the result of Example 1. Furthermore, in case of Example 2, $T_a = 530°$ C., $T_r = 20°$ C., $\Delta_a = 8.22 \times 10^{-6}/°$C. and $\Delta_d = 0.1\%$, so that $A = 5.2 \times 10^{-3}$, which well meets with the result of Example 2.

Therefore, the metal-ceramic composite body having a value represented by the above equation as an effective strain A has a maximum effective interference and therefore a maximum joining strength.

As mentioned above, according to the metal-ceramic composite body of the invention, when a fitting allowance in the press fitting is given by a value larger than a certain value, the effective interference is constant irrespective of the press fitting allowance and consequently the required press fitting or shrink fitting force can be obtained without highly accurately controlling the outer diameter of the ceramic member and the inner diameter of the metallic member.

Accordingly, the metal-ceramic composite bodies according to the invention can be used in structures requiring high strength and high reliability, for example, as a joint between a ceramic blade portion and metallic shaft in a ceramic turbocharger, as a joint between a ceramic piston head and metal or the like.

What is claimed is:

1. A metal-ceramic composite body comprising a metallic member made of an age-hardening alloy and provided with a concave portion or a through-hole and a ceramic member having a columnar or cylindrical shape or provided with a convex portion and having a portion fitted into the metallic member; said metallic member having an effective strain A in fitting represented by the following equation:

$$A = (T_a - T_r) \times \Delta_a + \Delta_d,$$

wherein A is an effective strain (interference at room temperature after age-hardening/diameter in the fitting portion of the ceramic member), $T_a$ is an aging temperature, $T_r$ is room temperature, $\Delta_a$ is a difference in thermal expansion coefficient between the ceramic and the metal and $\Delta_d$ is a shrinkage of the metallic member through aging.

* * * * *